Figure 1:
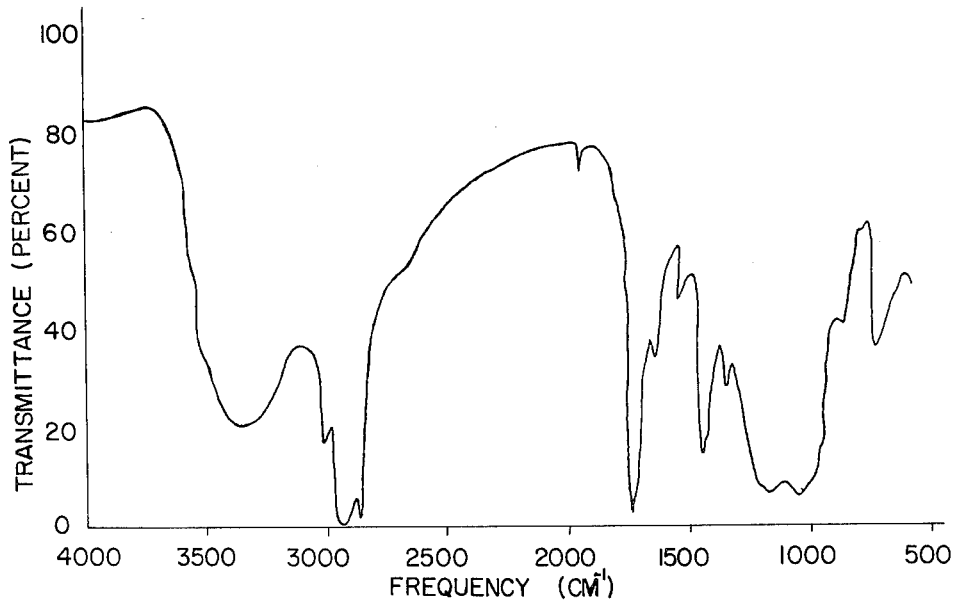

INVENTOR.
RUTH R. LEVINE 3,248,293
PHOSPHATIDO-PEPTIDE FRACTION AS A
CARRIER FOR CATIONIC SUBSTANCES
Ruth R. Levine, Brookline, Mass., assignor, by mesne assignments, to the United States of America as represented by the Secretary of the Department of Health, Education and Welfare
Filed Sept. 4, 1962, Ser. No. 221,043
2 Claims. (Cl. 167—74)

This invention relates to the use of an active factor, found in the phosphatido-peptide fraction derived from mammalian cells, as a carrier-transport to promote the in vivo transfer of certain compounds, especially those having a quaternary ammonium ion, across biological membranes.

It has long been recognized that certain pharmacologically active materials such as various quaternary ammonium compounds are much more effective when administered intravenously than when administered orally. The most dramatic example of this effect is in the use of curare (the active ingredient of which has been identified as d-tubocurarine, a bis-benzyl-iso-quinoline alkaloid in which the nitrogen atoms are quaternary) as an arrow poison by the Indians in the Amazon and Orinoco valleys and in the Guianas. Here experience has proven over the years that a dose of curare sufficient to be lethal to a large animal when injected into the blood stream by means of an arrow tip would have no effect upon a person eating the flesh of an animal killed in this way.

This discrepancy between oral and intravenous doses has been studied over the years by a number of investigators with a wide variety of quaternary ammonium compounds. While there are some differences in the specific in vivo absorptivity between specific compounds in the group investigated, it has been observed (1) that to be effective, an oral dose must be much larger than an intravenous dose, indicating poor absorption and (2) that the quaternary ammonium compound can be detected in the urine almost as soon after an oral administration as after an intravenous administration, indicating rapid absorption. In a typical instance, however, the total amount of the compound recovered in the urine within four hours after administration, represented only to 1 to 8% of the total dose when administered orally as compared to an 18 to 50% recovery in the same interval after intravenous injection.

These general observations, which are applicable to all mammals, have been confirmed by a carefully controlled series of studies of intestinal absorption using the method of in vivo intestinal loops and employing small mammals, especially rats. These studies have been variously reported in, for example, Levine et al., J. Pharmacol. 114; 78, 1955, Levine et al., J. Pharmacol. 131: 319, 1961 and Levine et al., J. Pharmacol. 131: 328, 1961.

In these studies it has been determined, using benzomethamine (the methobromide of N-di-ethyl-aminoethyl-N'-methylbenzilamide) as a typical quaternary ammonium compound, that the in vivo intestinal absorption of a quaternary ammonium compound begins almost at once; reaches a maximum rate very quickly; and thereafter, the rate of absorption decreases rapidly. The total amount absorbed ranged from 10 to 20% at the end of 3 to 4 hours and of this the major portion is absorbed within about the first one-half hour. These findings were in complete agreement with previously reported results involving the study of urinary excretion.

It has further been demonstrated that the presence of intestinal mucous material in the drug solution had the effect of decreasing the amount of quaternary compound absorbed per quantity administered, with the amount of decrease varying directly with the amount of mucous in the administered solution; that various agents such as amino acids, bile and bile salt, hexose acids and sorbitol had no effect on the in vivo absorption; that hyaluronic acid, chondoitin sulfate, sodium metaphosphate and calcium chloride decreased the in vivo absorption and that the saturated water soluble fatty acids such as acetic, propionic, and butyric acids increased by a small amount the absorption of quaternary compounds but only when the acids were used in relatively high concentration and at a relatively low pH. From these results, it can be postulated that the quaternary ammonium compound, which exists as a cation at all physiological levels of pH, is in part complexed at anionic binding sites within the gut and that that portion which is absorbed is transferred across the gut wall as a neutral complex by virtue of combination with an endogenous anion which acts as a carrier in the transport of the exogenous cation across the biological membrane.

A phosphorus-containing fraction of tissue, the phosphatido-peptide fraction, was first extracted and described by Folch in Phosphorus Metabolism, edited by McElroy and Glass, vol. II, page 186, Johns Hopkins Press, Baltimore, 1952. It has now been ascertained that this phosphatido-peptide extract of mammalian cells, when added to a cationic substance, such as a quaternary ammonium compound, acts to facilitate the in vivo transport of the exogenous cation across a biological membrane. The intestinal absorption of a cationic compound from in vivo intestinal loops has been increased in some instances three-fold or more by the addition to the compound of the phosphatido-peptide extract. There is some evidence that the extract forms a complex with the cationic material and it is postulated that the existence of this complex prevents the precipitation of the cationic substance at anionic binding sites within the gut. There is further evidence that the physiological activity of the cationic substance, once absorbed, is in no way altered by the apparent interaction with the extract.

The phosphorus-containing fraction, first isolated from brain tissue by Folch (supra), also has been found in intestinal tissue as well as heart, liver, lung, spleen, pancreas, and kidney tissue. It represents a fifth category of tissue phosphorus compounds since it cannot be classified as acid soluble phosphorus, free phosphatides, nucleic acids or phosphoprotein as usually defined. The phosphatido-peptide fraction is constituted by inositol, phosphate, esterified fatty acids, sphingosine or sphingosine-like material and amino acids, combined in polypeptide chains. The phosphatido-peptide fraction constitutes about $\frac{1}{10}$ of 1% of the cell weight.

The material used was isolated from rat small intestine following generally the method of Huggins and Cohn, J. Biol. Chem. 234,257; 1959, as outlined in the process diagram of FIG. 1. According to this method, the acid-soluble components of the tissue are removed with trichloro-acetic acid; the phospholipides are removed with alcohol-ether; nucleic acids are removed with 10% sodium chloride and the crude phosphatido-peptide fraction extracted from the remaining phosphoprotein by chloroform-methanol-hydrochloric acid. For the tests reported herein, the preparative procedure of Huggins and Cohn was modified to yield an aqueous extract containing the phosphatido-peptide. The chloroform-methanol-hydrochloric acid extract containing phosphatido-peptide fraction was evaporated to near dryness under vacuum and the resulting oily residue suspended either in Krebs-Hanseleit phosphate buffer, pH 7.4 or distilled water. The suspension was centrifuged at 950×g. for 15 minutes and the supernatent was regarded and used as the phosphatido-peptide fraction. It was found that 90% of the activity remained in the supernatent.

More specifically, in the preparation of the extract 10 gms. of fresh tissue were homogenized in a high speed homogenizer for one minute with 50 ml. of ice-cold 10% trichloroacetic acid. The homogenization and the subsequent washing procedures were carried out at approximately 0° C. It has been ascertained that the final extract loses its activity if the mixture is not maintained at a low temperature at this point in the procedure, due presumably to the enzymic destruction of the active factor. The homogenate was poured into a centrifuge tube, the homogenizer rinsed with 10 ml. of cold trichloroacetic acid and the rinse-solution added to the homogenate in the centrifuge tube. The mixture was allowed to stand for 15 minutes at 0° C. and was then centrifuged at 700×g. for 10 minutes.

The acid soluble residue was then washed twice with a 50 ml. portion of 10% trichloroacetic acid; twice with a 50 ml. portion of water and twice with a 50 ml. portion of acetone. Each washing was carried out at 0° C. for 10 minutes before centrifuging at 700×g. for 10 minutes. The washed insoluble residue was then extracted twice at room temperature with 50 ml. of 95% ethanol. The residue was again centrifuged at 700×g. for 10 minutes and then extracted twice with 50 ml. portions of a mixture of ethanol-ether (3:1) at 50° C.

The resulting lipide-insoluble residue was washed once with a 50 ml. portion of 5% trichloroacetic acid and twice with 50 ml. portions of distilled water. In order to separate the nucleic acid fraction, the washed lipide-soluble residue was extracted three times at 100° C. with 30 ml. portions of 10% aqueous sodium chloride for 30 minutes. The remaining insoluble residue was then washed twice with distilled water and twice with acetone.

The washed insoluble residue was next subjected to two extractions at 50° C. for 30 minutes with 40 ml. of an acidified chloroform-methanol mixture (chloroform: methanol: 12 N hydrochloric acid; 200: 100: 1). The supernatent fluids were then combined and filtered through a plug of glass wool with the resulting filtrate representing the crude phosphatido-peptide fraction. This extract was then evaporated to near dryness under vacuum and the resulting oily residue suspended in water or buffer and centrifuged as mentioned above. If the residue is permitted to dry beyond the oily state to a dry state, the activity is lost presumably due to the hydrolysis of the active factor in the presence of concentrated hydrochloric acid.

The active factor in the phosphatido-peptide fraction has not, to date, either been isolated or positively characterized chemically. As mentioned above, the fraction is constituted by inositol, phosphate, esterified fatty acids, sphingosine or a sphingosine-like material and amino acids combined in polypeptide chains. Sedimentation studies in the ultra-centrifuge, using the relatively pure extract, indicate that the material has a molecular weight in the range of 3,000 to 5,000. There is some indication that even the relatively pure material may be heterogenous.

Figure 2:
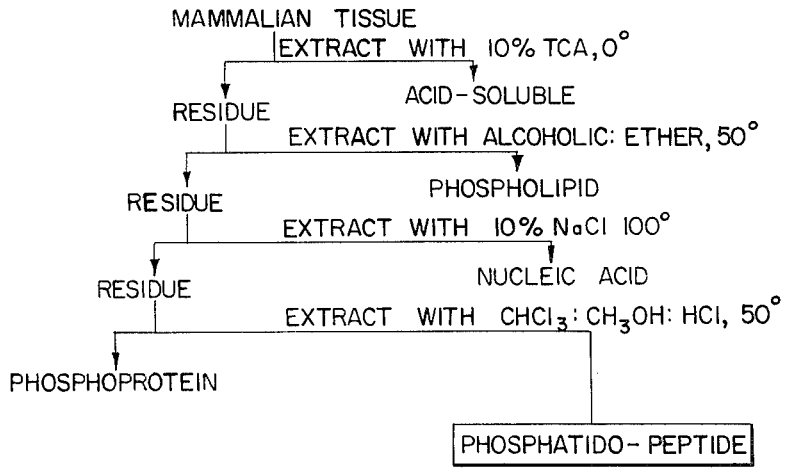

The infra-red absorption curve of the relatively pure extract deposited as a film from chloroform on silver chloride is shown in FIG. 2. The broad peak at the frequency of 3335 cm.$^{-1}$ indicates the presence of OH groups: the peak at 2940, the presence of methylene groups typical of fatty acids; the shoulder at about 3,000, the presence of methylene groups; the peak at 1750, the presence of ester-carbonyl; the peak at 1650, the presence of carbonyl; and the peak at 1520–1540, the presence of NH (peptide bonds).

In two-dimensional paper chromatography studies of acid-hydrolyzed samples of the relatively pure phosphatido-peptide extract, the following amino acids have been characterized: leucine (maybe isoleucine), phenylalanine, valine, proline, threonine, alanine, aspartic acid, glutamic acid, serine, glycine, tyrosine, lysine and arginine.

Fluorescence studies indicate that the material has an activation peak at 390 nu and a fluorescent peak at 470 nu. These results are similar to those obtained with inositol-phosphatides wherein a sugar moiety is attached to one of the hydroxyl groups of inositol through a phosphorous linkage.

While long term stability tests have not been run on the phosphatido-peptide fraction, it is known that the isolated fraction may be maintained at room temperature for periods in excess of 48 hours and at 4° C., for periods in excess of two weeks without any detectable decrease in activity.

All the studies reported herein, except where otherwise specifically noted, were conducted in vivo in non-fasted white rats of the Sprague-Dawley strain, weighing between 180 and 210 gm., employing the technique of in vivo intestinal loops described by Levine, et al., J. Pharmacol 114, 78, 1955: and Levine and Pelikan, J. Pharmacol 131, 319, 1961. According to this technique, the animal, having been denied food and water for a period of one to one and one-half hours, is placed under light ether anesthesia and the intestine exposed. A proximal ligature is placed about 6 inches from the pylorus and a loop about 4 inches long, determined by counting off 4 mesenteric blood vessels, is tied off by a distal ligature. No major blood vessels are occluded by these ties. The drug solution is injected quantitatively into the loop (without puncturing the duct gut wall between ligatures), the proximal ligature is secured and the incision closed. The animal appeared fully recovered from the procedure within five minutes. After three hours (unless a different time is specified) the animal is again anesthetized with ether and before the animal is killed, the loop of gut is removed for chemical analysis and the determination of the quantity of unabsorbed quaternary ammonium compound contained therein.

In multiple loop studies, the same general procedure was followed except that a second and sometimes a third intestinal loop was tied off, each loop being four mesenteric blood vessels in length, leaving about ½ inch of intestine between the end of one loop and the start of the next. At the end of the experiment, each loop is excised and analyzed separately. That portion of the gut used for the single loop, or for the first loop in a mutliple loop preparation, was always found to be macroscopically free of food. In about one-half of the cases, in multiple loop preparations, the more distal portion of the gut had to be cleared of visible boluses of food by means of a gentle milking technique. The total volume of the drug solution injected into a single loop was 0.5 ml. in every instance. In order to eliminate the possibility of any side reactions, the phosphatido-peptide fraction used in these studies was derived, except where otherwise noted, from the small intestine of the same strain of rats as used in the studies.

The major portion of the studies was conducted using benzomethamine, the methobromide of N-diethyl-aminoethyl-N'-methylbenzilamide as a typical mono-quaternary ammonium salt. This salt had previously been selected for such use (see Levine, et al., J. Pharmacol 114, 78, 1955) because it had been determined that it is relatively stable in animals (Levine and Clark, J. Pharmacol 114: 63, 1955); its pharmacological activity had been tested (Ursillo and Clark, J. Pharmacol 114: 54, 1955) and it had been tested clinically (McGowan and Stanley, J. Lab. and Clin. Med. 43: 359, 1954). The dose of benzomethamine was 0.5 mg./loop. Double loop preparations were used for controls, the loop positions of the control and of the experimental solution to be compared, being alternated in successive rats. Three kinds of control solutions were used. These were benzomethamine dissolved in buffer as a standard control; benzomethamine dissolved in a buffer solution of reagent blank of the extraction procedure as a negative control and benzomethamine dissolved in a buffer solution of the extract of pure albumin carried through the extraction procedure as a pseudo-tissue control.

The effect of varying amounts of phosphatido-peptide fraction on the in vivo absorption of benzomethamine in the rat is shown in Table I. The data were obtained using six separate extracts of intestinal tissue. There was no significant difference between the mean degree of absorption of the standard and negative controls. The mean percent absorption in the pseudo-tissue controls was significantly lower than the percent of absorption in either the standard or negative controls. In all cases in which the amount of extract used was equivalent to that derived from one or more grams of tissue, there was a significant increase in the amount of benzomethamine absorbed as compared with each of the three types of controls. It is also to be noted that in the case of benzomethamine, the increase in the absorption of the quaternary ammonium compound was a function of the amount of phosphatido-peptide present in the intestinal loop.

TABLE I

*Effect of phosphatido-peptide on the absorption of benzomethane in the art*

[All studies are for 3 hour absorption periods. Dose of Benzomethamine: 0.5 mg./loop]

| Experimental conditions in intestinal loop | Phosphatido-peptide in loop [1] | Percent Absorption | | Number of rats |
|---|---|---|---|---|
| | | Mean | S.D. | |
| Control, standard [2] | 0 | 20.0 | 1.1 | 6 |
| Control, negative [2] | 0 | 21.6 | 1.0 | 4 |
| Control, pseudo-tissue [2] | 0 | 7.0 | 1.5 | 8 |
| Phosphatido-peptide | 0.7 | 20.5 | 1.3 | 4 |
| Do | 1.0 | 35.7 | 1.3 | 7 |
| Do | 1.4 | 33.5 | 0.4 | 4 |
| Do | 1.7 | 39.8 | 0.3 | 4 |
| Do | 2.0 | 52.3 | 3.3 | 4 |
| Do | 2.5 | 40.5 | 0.5 | 4 |
| Do | 2.8 | 38.5 | 0.3 | 4 |
| Do | 3.3 | 60.0 | 2.7 | 7 |

[1] Expressed as grams of fresh tissue before extraction.
[2] See text.

For comparison, the phosphatido-peptide fraction was extracted from rat kidney and was found to increase the intestinal absorption to the same degree as the fraction derived from rat small intestine. In addition other phosphorous containing compounds have been investigated to determine their effect on the in vivo absorption of the quaternary ion. Simple compounds such as o-phosphorylserine and phosphorylcholine as well as the phosphatides, phosphatidylserine, phosphatidylethanolamine, alpha-lecithin were without effect on the degree of absorption of benzomethamine in vivo. Inositol-2-monophosphate and inositol phosphatide, which has been shown at the present in the phosphatido-peptide fraction, also had no effect on the absorption of benzomethamine in vivo.

It is known that the rate of absorption of quaternary compounds such as benzomethamine is rather rapid in the first hour of absorption (about 60 mcgm. per hour for a dose of 0.5 mg./loop), but declines sharply after this time to about 10 mcgm. per hour. In order to determine the effect of the phosphatido-peptide fraction on the degree of absorption of benzomethamine late in the absorption period when the rate is greatly diminished, a series of two-step absorption studies were carried out. Benzomethamine was injected into the intestinal loop of rats in the beginning of the experiment and the phosphatido-peptide fraction was injected only after two and one-half hours of absorption had elapsed. The mean percent absorption of benzomethamine at the end of 5 hours in the six animals receiving phosphatido-peptide fraction was 39.5±6.8 (means±S.D.) as compared with 24±1.9 for the control group receiving buffer in place of extract. The effect of adding phosphatido-peptide fraction to the intestinal loop midway in a total 5 hour absorption period was to increase absorption of benzomethamine by 15% above control levels. If it is assumed that the absorption in the first two and one-half hours is quantitatively equal for the control and experimental groups, then the phosphatido-peptide fraction was effective in increasing the rate of absorption of benzomethamine to an overall rate of 30 mcgm. per hour when the rate of absorption of the controls would be less than 10 mcgm. per hour.

In order to determine whether a causal relationship exists between the phosphatido-peptide fraction and the absorption of quaternary ammonium compounds, studies using a radioactively labelled phosphatido-peptide fraction were conducted. Rats were injected intraperitoneally with 200 microcuries of $P^{32}$ as sodium orthophosphate. After 2 hours, the entire small intestine was removed and the phosphatido-peptide fraction extracted as before. This fraction had a higher specific activity (400 to 700 cpm./mcgm. P) than either the phospholipide or the nucleic acid fractions. The fate of this labelled phosphatido-peptide fraction during absorption was studied in rats with the double loop technique. One loop contained the labelled fraction plus benzomethamine and the other loop just the labelled fraction. The loop portion was alternated in successive rates. The percentage loss of $P^{32}$ from the gut in 3 hours was found to be about the same as the percent absorption of benzomethamine and to be about the same in the absence of benzomethamine as in the presence of benzomethamine.

Some preliminary evidence has been obtained in vivo, using dialysis and 2-phase solvent techniques, that a complex is formed between the phosphatido-peptide fraction and benzomethamine.

In order to check the effectiveness of the phosphatido-peptide fraction in increasing the absorption of other typical quaternary compounds, tests similar to those shown in Table I were conducted using hexamethonium (hexamethylene-bis (triethylammonium bromide); oxyphenonium (Antrenyl), (diethyl (2-hydroxyethyl) methylammonium alpha-phenylcyclohexine glycolate bromide) and Secergan (10 - (alpha-dimethyl-aminopropionyl)-phenothiazide methobromide). The results are tabulated in Table II. For each drug the data were obtained using two or more separate extracts of intestinal tissue as the source of the phosphatido-peptide fraction. As before, a constant volume of 0.5 ml./loop with a dose of the drug of 0.5 mg./loop was used. For the controls, the drugs was dissolved in Krebs-Henseleit buffer at a pH of 7.4.

TABLE II

*Effect of phosphatido-peptide on the absorption of quaternary ammonium compounds in the rat*

[All studies for 3 hour absorption periods. Dose of quaternary compounds: 0.5 gm./loop]

| Dose of phosphatido-peptide in intestinal loop [1] | Mean percent absorption | | |
|---|---|---|---|
| | Oxyphenonium | Secergan | Hexamethonium |
| 0 (control) | 24 | 17 | 30 |
| 0.7 | 15 / 30 | | |
| 1.4 | [2] 46 / [2] 61 | [2] 52 | 34 |
| 2.8 | [2] 50 / [2] 62 | [2] 46 | 27 / 38 |
| 5.6 | [2] 62 | [2] 52 | [2] 60 / [2] 40 / [2] 50 |

[1] Expressed as grams of fresh tissue before extraction.
[2] Significant increase in absorption as compared with control (P<0.05).

Each mean represents the average of at least 4 animals.

There was a significant increase in the amount of oxyphenonium and Secergan absorbed (P<0.05 as compared to their respective controls without extract) whenever the amount of phosphatido-peptide fraction added to the intestinal loop was in excess of that which can be extracted from one gram of intestinal tissue. The increase in absorption of hexamethonium above control levels was statistically significant in only one out of three groups of animals which received amounts of extract equivalent to 2.8 g. of tissue but was significant in both groups receiving the higher dose.

The increase in absorption of oxyphenonium and Secergan varies directly with the amount of fraction present in the intestinal loop within only a narrow range of doses of the phosphatido-peptide fraction. It appears that with doses of extract greater than one gram-equivalents of tissue, further increases in dose of extract produce little, if any, increase in absorption of either oxyphenonium or Secergan. Approximately 60% absorption may, then, represent the maximum absorption possible for these two agents under these conditions. In contrast, in the case of hexamethonium, clear-cut facilitation of absorption cannot be demonstrated with doses less than 2.8 gram-equivalents of tissue and even with doses equivalent to 5.6 g. of tissue there is no evidence to indicate whether or not a maximum facilitation has been attained. The percent absorption of hexamethonium in the absence of extract is, however, significantly higher than for either oxyphenonium or Secergan in the absence of extract. Qualitative differences in other aspects of tissue distribution have been shown to exist between bis-quaternary ammonium compounds, such as hexamethonium, and mono-quaternary ammonium compounds such as oxyphenonium and benzomethamine. The quantitative differences in the facilitatory effect of phosphatido-peptide fraction on absorption seen with hexamethonium and the mono-quaternary agents may be a result of qualitative differences in mechanism of absorption or may be related merely to stoichiometric consideration of two positively charged centers versus one such center.

It appears that the quantity of the fraction derived from about 1.4 gms. of tissue is a stoichiometric equivalent of 0.5 mg. of a compound having a single quaternary ammonium ion. Since the fraction constitutes about 1/10 of 1% of the total weight of the cell from which it is derived, the stoichiometric equivalent appears to be in the range of 3 mg. of isolated fraction for each milligram of drug per quaternary nitrogen in the drug.

In order to determine whether or not the addition of the phosphatido-peptide fraction alters the pharmacological activity of the quaternary compound, a series of tests were conducted using as the quaternary compound, tubocurarine. In this series, rats of the same species, sex and weight as before were anesthetized and a polyethylene tube inserted through the back of the neck, underneath the skin along the back, through a hole made in the top of the stomach, directly into the small intestine terminating beyond the pylorus. After the rat had completely recovered from the operation and from the effects of the anesthesia, a 0.5 ml. dose was forced down through this tube directly into the small intestine. As indicated below, the dose consisted of varying amounts (0 to 60 mg./kg.) of tubocurarine dissolved either in Krebs-Henseleit buffer or in buffered phosphatido-peptide fraction. In each case, the quantity of phosphatido-peptide fraction, when used, was equal to that amount derived from 1.4 gm. of rat small intestine irrespective of the amount of tubocurarine. The time interval between administration and when the rat fell off of an inclined screen was measured as well as the time interval between administration and death (cessation of respiration). In either case, the experiment was terminated after 30 minutes.

In measuring the time to fall off an inclined screen, the following results were obtained:

TABLE III

| Dose of tubocurarine | Time, in minutes, to fall off inclined screen | |
|---|---|---|
| | In buffer | In phosphatido-peptide fraction |
| 0 | [1] 30 | [1] 30 |
| 8 | | 2 |
| | | 5 |
| 15 | | 2 |
| | | 3 |
| 31 | [1] 30 | |
| | [1] 30 | |
| | 8 | |
| | 4 | |
| 62 | 3 | |
| | 2 | |

[1] See footnote 2, Table II.

In measuring the time until death, the following results were obtained:

TABLE IV

| Dose of tubocurarine | Time to Death in Minutes | |
|---|---|---|
| | In buffer | In phosphatido-peptide fraction |
| 0 | [1] 30 | [1] 30 |
| 8 | | 6 |
| | | [1] 30 |
| 15 | | 7 |
| | | 8 |
| 31 | [1] 30 | |
| | [1] 30 | 5 |
| | [1] 30 | |
| | 17 | |
| | 13 | |
| 62 | 11 | |

[1] See footnote 2, Table II.

These tests indicate quite conclusively that the addition of the phosphatido-peptide fraction to the tubocurarine increases the absorption of the tubocurarine through the small intestine and that the addition of the phosphatido-peptide fraction in no way interferes with or alters the pharmacological activity of the tubocurarine.

It would appear that the isolated phosphatido-peptide fraction can be used as a carrier to aid in the absorption of compounds having active cationic groups across various biological membranes. Since it is expected that the phosphatido-peptide fraction would be destroyed in the stomach in oral administration, the fraction would be combined with the pharmacological material in capsules provided with an enteric coating.

I claim:
1. A method for promoting the absorption of a quaternary ammonium compound across a biological membrane which comprises admixing said compound with effective quantity of the isolated phosphatido-peptide fraction of mammalian cells.
2. A pharmaceutical preparation enjoying an increased absorption across biological membranes which comprises a mixture of a quaternary ammonium compound and the isolated phosphatido-peptide fraction of mammalian cells.

References Cited by the Examiner

UNITED STATES PATENTS 3,090,725   5/1963   Copp et al. _____ 167—55

OTHER REFERENCES

Journal of Medicinal and Pharmaceutical Chemistry, vol. 2, No. 4 (1960), pp. 343–359 (pages 344, 345, 354 and 356–358 relied on).

(Additional references on following page)

Levine et al.: Biochem. Pharmacol., vol. 8, pp. 248–250 (Sept. 1961), (cited in Chem. Abst., vol. 56 (1962) pp. 881–882).

Levine: J. Pharmacology, vol. 114, (1955), p. 78, vol. 121, (1957), page 63.

McElroy et al.: "Phosphorous Metabolism" (article by Folch), vol. II, pp. 186–202, Johns Hopkins Press, Baltimore, Md., 1952.

JULIAN S. LEVITT, *Primary Examiner.*

FRANK CACCIAPAGLIA, JR., *Examiner.*

GEORGE A. MENTIS, *Assistant Examiner.*